United States Patent
Chakra et al.

(10) Patent No.: US 9,419,808 B2
(45) Date of Patent: Aug. 16, 2016

(54) SYSTEM AND METHOD FOR POST RESONANCE

(71) Applicant: International Business Machines Corporation, Armonk, NY (US)

(72) Inventors: Al Chakra, Apex, NC (US); Liam Harpur, Skerries (IE); John Rice, Tramore (IE)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 14/221,503

(22) Filed: Mar. 21, 2014

(65) Prior Publication Data
US 2015/0270981 A1    Sep. 24, 2015

(51) Int. Cl.
*H04L 12/18* (2006.01)
*H04L 29/06* (2006.01)
*H04L 12/58* (2006.01)

(52) U.S. Cl.
CPC .......... *H04L 12/1813* (2013.01); *H04L 51/12* (2013.01); *H04L 65/1089* (2013.01); *H04L 65/403* (2013.01)

(58) Field of Classification Search
CPC ... H04L 12/1813; H04L 67/325; H04L 67/42; H04L 65/1089; H04L 65/403
See application file for complete search history.

(56) References Cited

U.S. PATENT DOCUMENTS

| | | | | |
|---|---|---|---|---|
| 6,594,255 B1 * | 7/2003 | Neuman | ............... | H04L 12/581 370/271 |
| 8,312,364 B2 * | 11/2012 | Rowe | .................... | G06Q 30/02 715/205 |
| 2006/0029106 A1 * | 2/2006 | Ott | ......................... | G09B 7/02 370/522 |
| 2007/0174404 A1 * | 7/2007 | Hui | .................... | G06Q 10/109 709/207 |
| 2012/0215872 A1 * | 8/2012 | Beardsmore | ............ | H04L 51/14 709/207 |
| 2013/0103773 A1 * | 4/2013 | Tsukidate | ............... | H04L 51/12 709/206 |
| 2014/0068052 A1 * | 3/2014 | Coleman | ................. | H04L 47/82 709/224 |

OTHER PUBLICATIONS

Disclosed Anonymously, "Community Activity-Based Scheduling of Social Media Posts," IPCOM000229521D, Aug. 4, 2013, IP.com, pp. 1-4.*

* cited by examiner

*Primary Examiner* — Michael C Lai
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and computing system is provided for creating resonance around posts to a collaboration session by important individuals. In an implementation, a method may include determining an importance level associated with a first user. The method may also include receiving content from the first user for publication to a collaboration session. The method may also include publishing the content from the first user to the collaboration session. The method may further include preventing publication of content from at least another user to the collaboration session for a resonance time period proximate publishing the content from the first user.

11 Claims, 5 Drawing Sheets

SYSTEM AND METHOD FOR POST RESONANCE

TECHNICAL FIELD

The present disclosure generally relates to systems and method for electronic collaboration, and more particularly relates to facilitating the recognition of content by important individuals.

BACKGROUND

Various collaboration systems exist for enabling individuals to engage in collaborate activities, such as working together on projects, sharing information, and the like. Collaboration systems can be particularly useful in allowing geographically dispersed individuals to interact and work with one another. Using various different collaboration systems, or multi-functional collaboration systems, individuals who are geographically remote from one another may, for example, exchange and share content, such as ideas, thoughts, or creations, and participate in interactive discussions using group messaging systems, blogs, forums, wikis, and social networking applications; engage in common work projects, for example, using online team work spaces, and engage in meetings, for example, using electronic meeting systems that allow for presentations, lectures, seminars, and the like.

SUMMARY OF DISCLOSURE

According to an implementation, a computer-implemented method may include determining, by a computing device, an importance level associated with a first user. The method may also include receiving content from the first user for publication to a collaboration session. The method may also include publishing the content from the first user to the collaboration session. The method may further include preventing publication of content from at least another user to the collaboration session for a resonance time period proximate publishing the content from the first user.

One or more of the following features may be included. Preventing publication of content from the at least another user may include one or more of preventing display of the content by the collaboration session for the resonance time period, and preventing the creation of the content for the resonance time period. The resonance time period may include one or more of a time period before publishing the content from the first user and a time period after publishing the content from the first user.

The resonance time period may include a predetermined time period. The resonance time period may be a dynamic time period based upon, at least in part, one or more of a length of the content from the first user, and a semantic complexity of the content from the first user. The resonance time period may be a dynamic time period based upon, at least in part, an importance level associated with the first user. The method may also include receiving a resonance request from the first user. Preventing publication of content from the at least another user may be in response to the resonance request.

According to another implementation, a computer program product includes a computer readable storage medium having a plurality of instructions stored on it. When executed by a processor, the instructions may cause the processor to perform operations including determining an importance level associated with a first user. Instructions may also be included for receiving content from the first user for publication to a collaboration session. Instructions may also be included for publishing the content from the first user to the collaboration session. Instructions may further be included for preventing publication of content from at least another user to the collaboration session for a resonance time period proximate publishing the content from the first user.

One or more of the following features may be included. The instructions for preventing publication of content from the at least another user may include instructions for one or more of preventing display of the content by the collaboration session for the resonance time period, and preventing the creation of the content for the resonance time period. The resonance time period may include one or more of a time period before publishing the content from the first user and a time period after publishing the content from the first user.

The resonance time period may include a predetermined time period. The resonance time period may be a dynamic time period based upon, at least in part, one or more of a length of the content from the first user, and a semantic complexity of the content from the first user. The resonance time period may be a dynamic time period based upon, at least in part, an importance level associated with the first user. Instructions may also be included for receiving a resonance request from the first user. Preventing publication of content from the at least another user may be in response to the resonance request.

According to yet another implementation, a computing system includes a processor and a memory module coupled with the processor. The processor may be configured for determining an importance level associated with a first user. The processor may also be configured for receiving content from the first user for publication to a collaboration session. The processor may also be configured for publishing the content from the first user to the collaboration session. The processor may further be configured for preventing publication of content from at least another user to the collaboration session for a resonance time period proximate publishing the content from the first user.

One or more of the following features may be included. The processor configured for preventing publication of content from the at least another user may be further configured for one or more of preventing display of the content by the collaboration session for the resonance time period, and preventing the creation of the content for the resonance time period. The resonance time period may include one or more of a time period before publishing the content from the first user and a time period after publishing the content from the first user.

The resonance time period may include a predetermined time period. The resonance time period may be a dynamic time period based upon, at least in part, one or more of a length of the content from the first user, and a semantic complexity of the content from the first user. The processor may be further configured for receiving a resonance request from the first user. Preventing publication of content from the at least another user may be in response to the resonance request.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
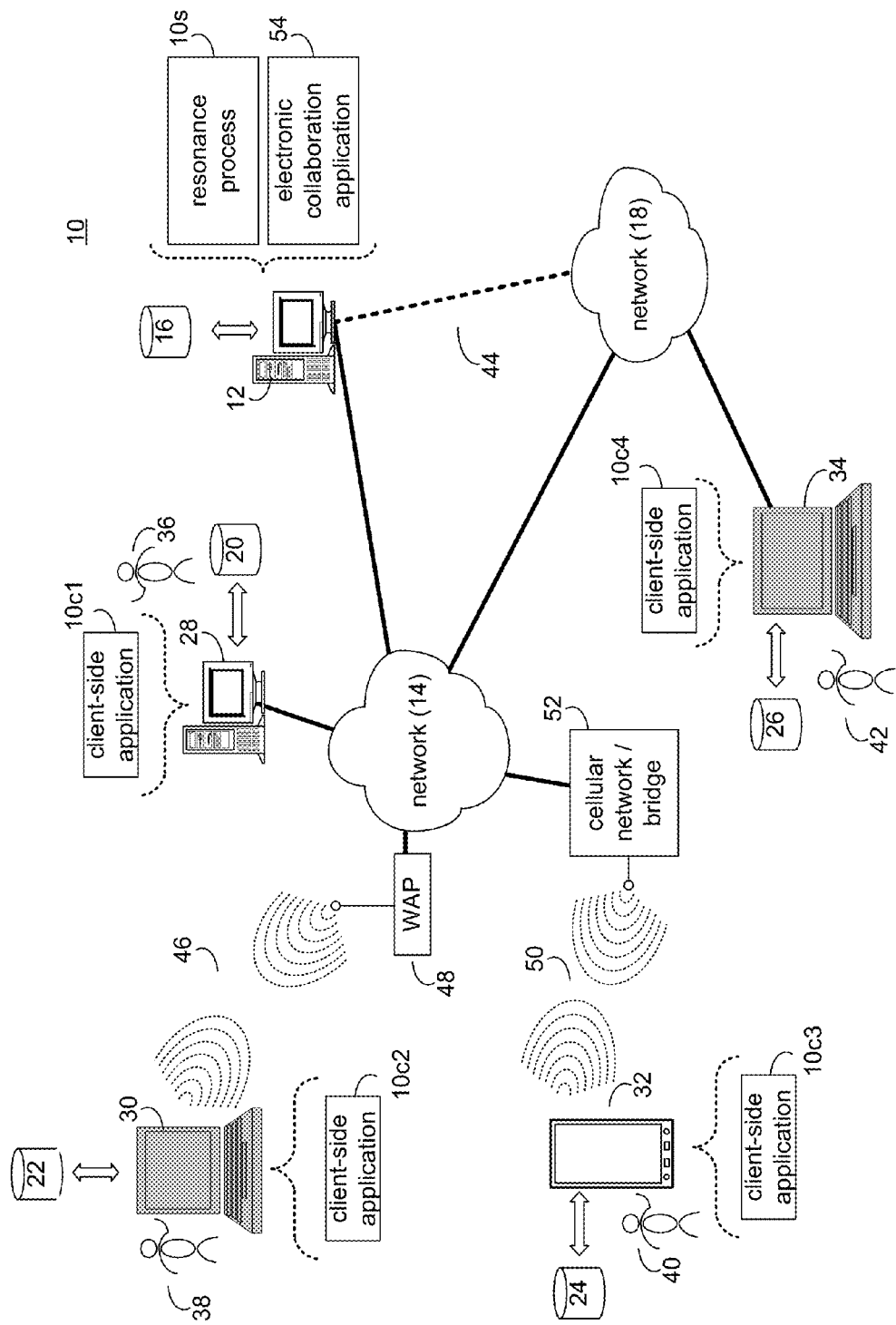
FIG. 1 is a diagrammatic view of a distributed computing network including a computing device that executes a resonance process according to an implementation of the present disclosure.

Individuals may often engage in collaboration sessions, utilizing a data network for sharing content with one another. Consistent with some embodiments of the present disclosure, users may engage in collaboration sessions, such participating in interactive discussions or the like. For example, users may create and share content, such as their thoughts, opinions, ideas, and creations, with one another using a variety of collaboration systems. Some collaboration systems may allow users to post content to a shared space, or otherwise transmit content to other participants of a collaboration session. Examples of collaboration environments utilized in connection with some embodiments of the present disclosure may include forums (such as internet forums or privately hosted forums), wikis, blogs, instant messaging chats, social networking application (e.g., in which users may post content to a common page, site, or system for dissemination to others), shared team spaces, and the like. In some implementations, content posted by participants in a collaboration session may be shared with other participants in the collaboration session in real time and/or in near real time. As such, participants in a collaboration session may participate in interactive discussion, share content (such as posts, images, creative works, etc.), engage in common projects, and the like.

In some embodiments, the present disclosure may create a resonance surrounding a post by individuals of particular importance. For example, in a collaboration session involving many participants, or involving one or more prolific posters, a relatively large amount of content may be published to the collaboration session in relatively short amount of times. As such, individual posts may quickly become stale in the face of newer posts, rapid changes in topics, and the like. It may happen, therefore, that content from important individuals, which may hold a comparatively high value, may be missed by participants in the collaboration session, or may not be given appropriate consideration. In an embodiment, the present disclosure may create a resonance surrounding a post by individuals of particular importance. The resonance surrounding a post may be created by preventing posts by others from being published to the collaboration session for a time period surrounding post by the individual of particular importance. In some embodiments, the resonance may serve to highlight the potential significance of the post by the important individual. In some embodiments, the resonance may provide an opportunity for participants in the collaboration session to consume and contemplate the post by the important individual, without the distraction or interruption of new posts being added to the collaboration session.

The importance of the individual, giving rise to the creation of a resonance surrounding his or her post, may be based on, at least in part, objective criteria and/or subjective criteria. Similarly, the importance of the individual may be based on, at least in part, absolute or fixed criteria, or may be relative by comparison to one or more other participants in the collaboration session. For example, the importance of the individual may be based on a defined organizational hierarchy (e.g., an executive within a company) or social hierarchy (e.g., an individual with a high degree of knowledge or experience in a particular area, experience or knowledge in a particular field, or with a particular social status, etc.), or having a comparatively higher rank within an organization hierarchy, social hierarchy, or by comparison one or more other participants in the collaboration session. Such relatively high importance of the individual may indicate a greater likely value of posts by the important individual as compared to other participants in the collaboration session. In some embodiments, the relative importance of the individual may be contextually based.

The resonance may be created by preventing content by other participants in the collaboration session from being published for a period of time surrounding the publication of content by the important individual. The time period may include a period of time before the content by the important individual is published. Additionally/alternatively, the time period may include a time period after the content by the important individual is published to the collaboration session. The length of the time period may be predetermined and/or may by dynamic (e.g., based upon, at least in part, the content published by the individual, the importance of the individual, etc.).

Referring to FIG. 1, there is shown resonance process 10. For the following discussion, it is intended to be understood that resonance process 10 may be implemented in a variety of ways. For example, resonance process 10 may be implemented as a server-side process, a client-side process, or a server-side/client-side process.

For example, resonance process 10 may be implemented as a purely server-side process via resonance process 10s. Alternatively, resonance process 10 may be implemented as a purely client-side process via one or more of client-side application 10c1, client-side application 10c2, client-side application 10c3, and client-side application 10c4. Alternatively still, resonance process 10 may be implemented as a server-side/client-side process via server-side resonance process 10s in combination with one or more of client-side application 10c1, client-side application 10c2, client-side application 10c3, and client-side application 10c4. In such an example, at least a portion of the functionality of resonance process 10 may be performed by resonance process 10s and at least a portion of the functionality of resonance process 10 may be performed by one or more of client-side application 10c1, 10c2, 10c3, and 10c3.

Accordingly, resonance process 10 as used in this disclosure may include any combination of resonance process 10s, client-side application 10c1, client-side application 10c2, client-side application 10c3, and client-side application 10c4.

Figure 2:
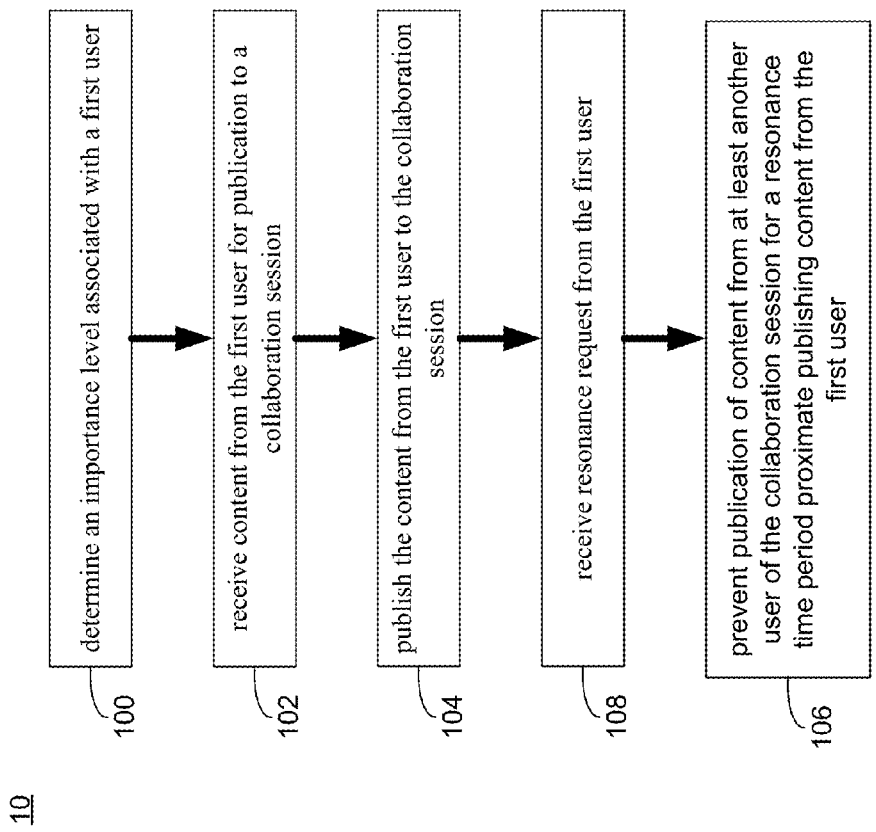
FIG. 2 is a flowchart of the resonance process of FIG. 1, according to an implementation of the present disclosure.

Referring also to FIG. 2, and as will be discussed in greater detail below, resonance process 10 may determine 100 an importance level associated with a first user. Resonance process 10 may also receive 102 content from the first user for publication to a collaboration session. Resonance process 10 may also publish 104 the content from the first user to the collaboration session. Resonance process 10 may further prevent 106 publication of content from at least another user to the collaboration session for a resonance time period proximate publishing the content from the first user.

Resonance process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of resonance process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of an instant messaging application, a social networking application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access resonance process 10 directly through network 14 or through secondary network 18. Further, resonance process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, resonance process 10 may communicate with, interact with, and/or include a component or module of a collaboration application (e.g., collaboration application 54). As is generally known, a collaboration application (e.g., collaboration application 54) may generally facilitate text, graphical, multi-media, audio, and/or video collaboration between individuals as participants in a collaboration session. Examples of collaboration application 54 may include, but are not limited to, instant messaging applications, an electronic meeting application, applications that support forums for user posted content, wikis, social networking applications, team rooms, and the like. For example, collaboration application 54 may allow multiple users to post content (such as text-based content, graphical content, etc.) for consumption by other participants in the collaboration session. In some embodiments, collaboration application 54 may allow for real time, or near-real time, publication of content by participants in a collaboration session. For example, users of collaboration application 54 may create posts which may be published to a page, space, or site for consumption by other users. In some embodiments, a communication session may only include two participants. In some embodiments, a communication session may include more than two participants.

In an embodiment, the instruction sets and subroutines of electronic collaboration application 54 may be stored, e.g., on storage device 16 associated with server computer 12, which executes electronic collaboration application 54, and/or another suitable storage device. Further, users (e.g., one or more of users 36, 38, 40, 42) may access electronic collaboration application 54 in order to participate in a collaboration session (such as a group messaging session; an exchange of postings to a forum, wiki, or social networking page or site; or the like). The users may access electronic collaboration application 54 via one or more suitable applications, such as client side applications 10c1-10c4 (e.g., which may include an instant messaging application, a web browser, a client electronic meeting application, or another application) and/or via a different application (not shown).

As generally discussed above, a portion and/or all of the functionality of resonance process 10 may be provided by one or more of client side applications 10c1-10c4. For example, in some embodiments resonance process 10 (and/or client-side functionality of resonance process 10) may be included within and/or interactive with client-side applications 10c1-10c4, which may include client side electronic collaboration applications, web browsers, or another application. In other embodiments, a portion and/or all of the functionality of resonance process may be provided by electronic collaboration application 54, and/or another server-side application. Various additional/alternative configurations may be equally utilized.

As generally discussed above with reference to FIG. 2, resonance process 10 may determine 100 an importance level associated with a first user. Resonance process 10 may also receive 102 content from the first user for publication to a collaboration session. Resonance process 10 may also publish 104 the content from the first user to the collaboration session. Resonance process 10 may further prevent 106 publication of content from at least another user to the collaboration session for a resonance time period proximate publishing the content from the first user.

In an implementation, resonance process 10 may create a resonance around a post by an important individual to a collaboration session. In an example collaboration session there may be a high volume of activity, which may manifest as a large volume of content posted by participants in relatively quick succession. In such a situation, posts by important people may not receive proper understanding or contemplation, or may not be recognized for the importance of the post, as a result of the rapid accumulation of content being posed to the collaboration session. The resonance provided by resonance process may, for example, allow the other participants in the collaboration session to consume, understand, and/or contemplate the post by the important person.

Figure 3:
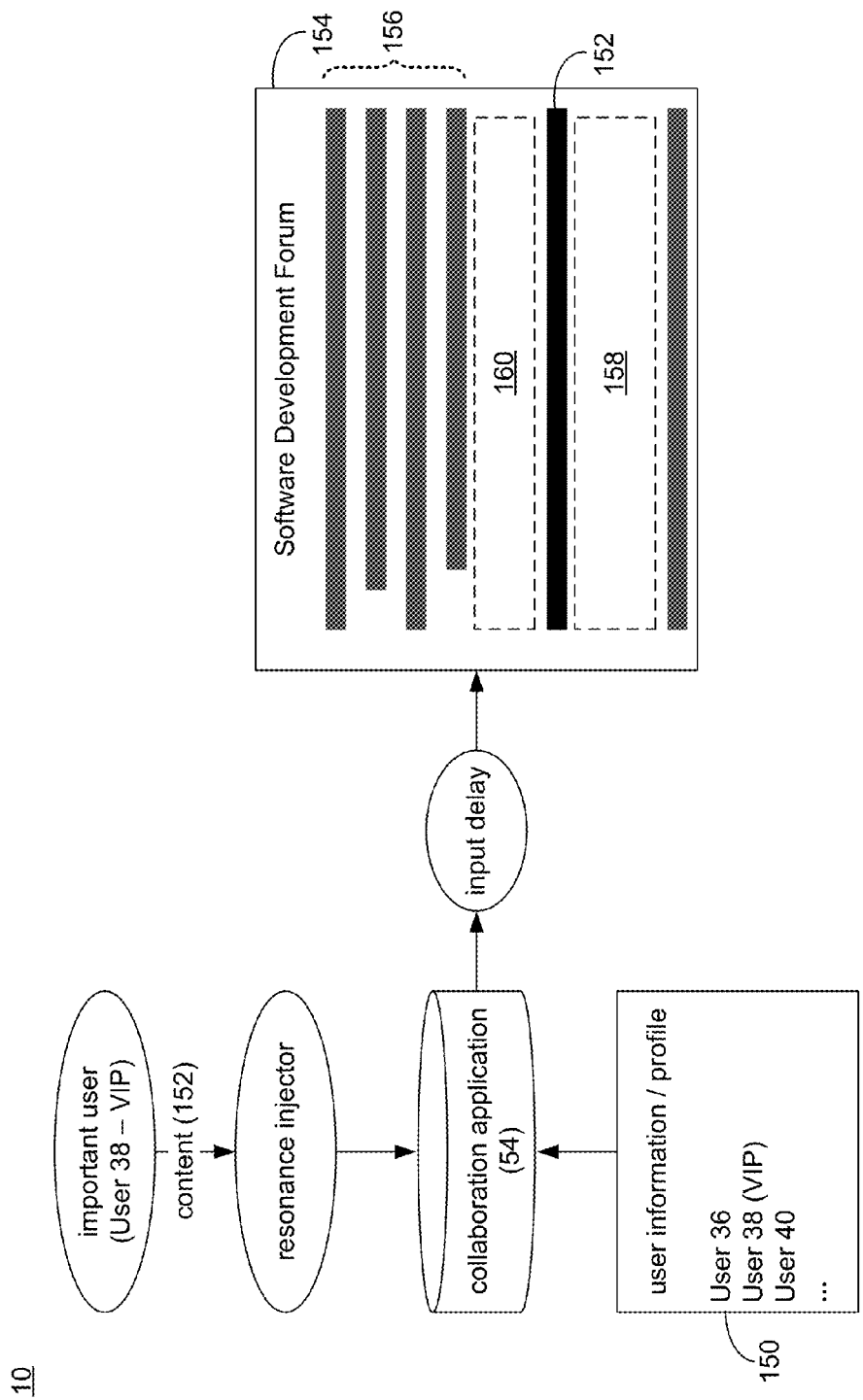
FIG. 3 diagrammatically depicts an implementation of the resonance process of FIG. 1, according to an example embodiment.
Figure 4:
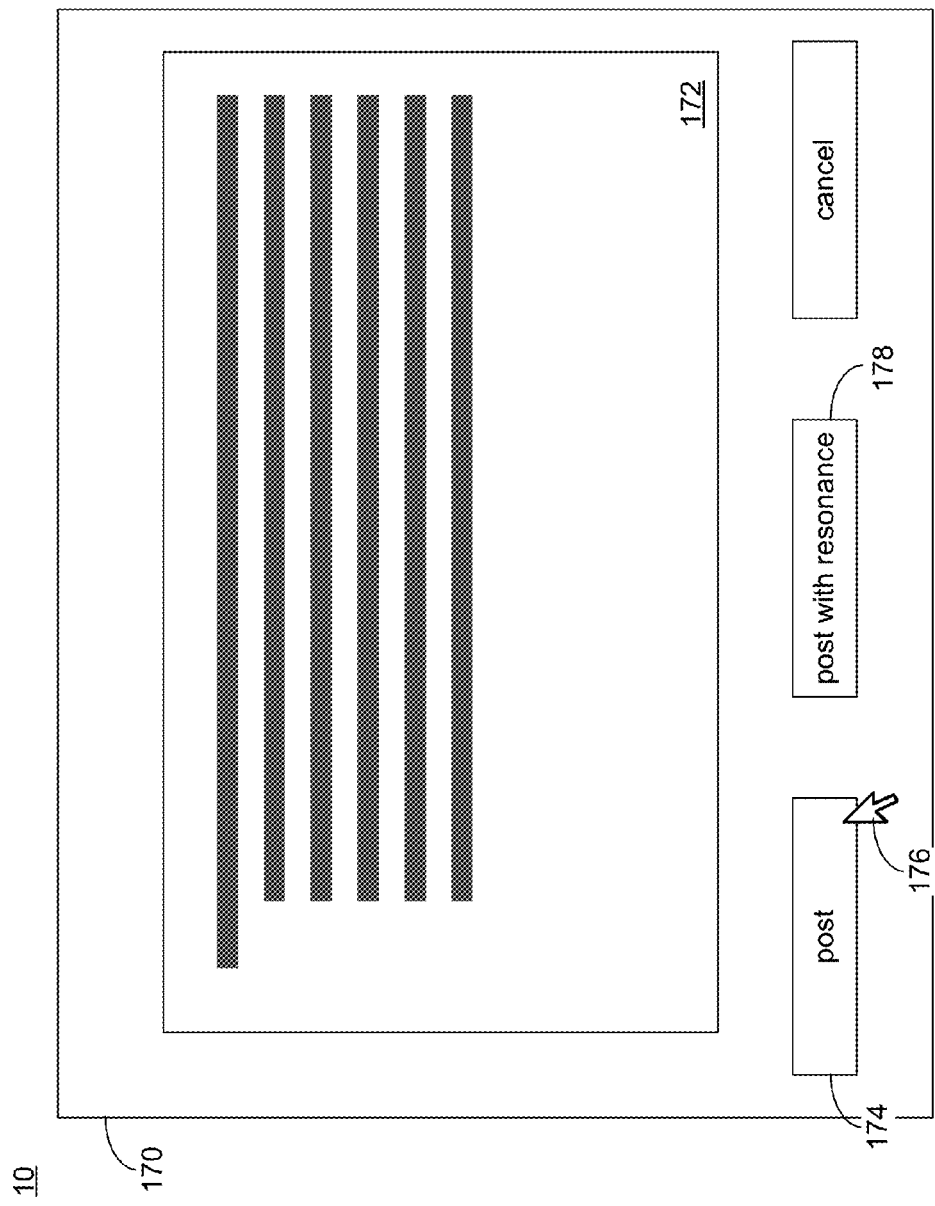
FIG. 4 diagrammatically depicts an implementation of the resonance process of FIG. 1, according to an example embodiment.

Referring also to FIGS. 3 and 4, resonance process 10 may determine 100 an importance level associated with a first user, who may be a participant in a collaboration session. The collaboration session may be facilitated through, but not limited to, a forum, wiki, group chat (e.g., instant messaging chat session), social networking, shared online spaces, or other electronic environments in which at least some of the participants may post content that may be received by, or viewable by, participants in the collaboration session in real time and/or near real time. The content may include text posting, graphics, multimedia content, and the like. As such, the collaboration session may allow participants to engage in interactive discussions, share information, share creative works, share opinions, and the like.

As discussed above, resonance process 10 may determine 100 an importance level associated with the first user (e.g., user 38 in the illustrated example). The importance level associated with the first user may be based upon, at least in part, a variety of factors. For example, the importance level associated with the first user may be based on a title or rank of the first user within a corporate structure, or other organizational hierarchy. For example, the first user might by a corporate office, a vice president, a manager, or the like. In an embodiment, the importance level of the first user may be based upon, at least in seniority or level of experience or a qualification of the first user. For example, the first user may be a software developer with ten years of experience with Java, or another programming language, or the like. Further, the importance level associated with the first user may be based upon, at least in part, another characteristic or qualification or attribute of the first user. In various embodiments, resonance process 10 may determine 100 the importance level associated with the first user based upon, at least in part, a variety of information sources. For example, a title, rank, or position of the first user may be indicated in an organizational directory, such as an LDAP directory, or the like, which may be accessible to and/or queried by resonance process 10. In an example, resonance process 10 may determine 100 the importance level associated with the first user based upon, at least in part, a user profile established for the collaboration session (such as a social networking profile, a user profile provided as a registration process for a forum or other collaborative space, or the like). It will be appreciated that resonance process 10 may determine the importance level associated with the first user based upon various additional and/or alternative information sources. Such organizational and/or profile information (e.g., user information/profile 150) may be accessed and/or queried by resonance process 10, collaboration application 54, and/or another process or application.

In an embodiment, the importance level associated with the first user may include an absolute importance level. For example, an importance level may be based upon, at least in part, a rank within a corporate structure. As such, if the first user has a rank of X, the first user may have an importance level of Y. For example, a CEO may have an importance level of 10. All vice presidents of the corporation may have an importance level of 7, and all managers may have an importance level of 5. Similar absolute importance levels may be utilized in connection with other attributes. For example, a predefined schema may be utilized to associate particular importance levels with seniority, experience level, and/or various other attributes.

In some embodiments, the importance level associated with the first user may include a relative importance level. The relative importance level may be, for example, based upon a comparison between the first user an one or more other participants of the collaboration session. For example, an importance level based upon, at least in part, experience may be determined 100 relative to the average experience level of the participants in the collaboration session. In an illustrative example, if the first user has ten years of experience programming in Java, if the average experience level of the other participants in the collaboration session is five years of experience, resonance process 10 may determine 100 an importance level of 8 with the first user. However, if the average experience level of the other participants in the collaboration session is 12 years, resonance process 10 may determine 100 an importance level of 3 with the first user (e.g., by reference to a common importance level scale). Similarly, a relative importance level may be based upon, at least in part, a context of the collaboration session. For example, resonance process 10 may determine 100 a relatively high importance level with the first user having ten years of programming experience in Java when a topic of the collaboration session pertains to programming and/or programming in Java. However, in some embodiments ten years of programming experience in Java may not impact an importance level associated with the first user when the topic of the collaboration session pertains to consumer product marketing, for example. While specific examples have been described it will be appreciated that absolute and/or relative importance levels may be similarly applicable to other characteristics and/or attributes of the first user.

In an embodiment, the importance level associated with the first user may be determined 100 as a binary importance level. For example, the first user may be determined to either be important or to not be important (e.g., positive importance, or negative importance). In an embodiment, various thresholds (e.g., absolute thresholds and/or relative thresholds) may be utilized for determining a positive or a negative importance level. In an example of absolute measurement of importance level based upon, at least in part, experience level, if the first use has ten years or more of experience, first user may be determined 100 to have a positive importance level. If the first user has less than ten years of experience the first user may be determined 100 to have a negative importance level. In a similar example of relative importance level, if the first user has greater than five years more experience than the average experience level of the participants of the collaboration session, the first user may be determined 100 to have a positive importance level. It will be appreciated that the threshold values described herein are intended for the purpose of illustration and not of limitation. Various threshold values may be determined based upon design criteria and/or user need or preference. Similar thresholds may be utilized in connection with other characteristics and/or attributes of the first user.

While the illustrative examples generally relate to determining 100 an importance level associated with the first user based upon a single attribute and/or criteria, it will be appreciated that the importance level may be based upon, at least in part, a combination of two or more attributes and/or criteria. For example, resonance process 10 may determined 100 an importance level associated with the first user based upon, at least in part, the first user's rank within an organization, the first user's level of experience, and first user's seniority level, and/or any other combination of attributes and/or criteria. Further, one or more weighting factors may be applied to each, or a portion, of the attributes and/or criteria. Further, in an embodiment the aggregate importance level (based upon, at least in part, the plurality of attributes and/or criteria) may be compared to a threshold, e.g., to determine a positive and/or a negative importance level associated with the first user.

Resonance process 10 may also receive 102 content from the first user for publication to a collaboration session. As generally described above, the collaboration session may allow participants to post content to be shared with the other participants, as by posting the content to location accessible by the other participants (e.g., a forum, a social networking page, a shared online space, a webpage, or the like), by transmitting the content to the other participants (e.g., transmitting the content to instant messaging applications associated with the other participants), or otherwise sharing the content with at least a portion of the participants of the collaboration session. In some embodiments, the collaboration session may allow posed content to be shared with at least a portion of the participants in a generally real time, or a near real time, manner. As generally described above, collaboration sessions may allow various different types of content to be shared with participants of the collaboration session. Examples of content that may be posted to the collaboration session may include, but are not limited to, text, images (e.g., graphics), files, video, audio, multimedia, and the like.

With particular reference to FIG. 4, the first user (e.g., user 38) may create and/or define content to be posted to the collaboration session via user interface 170, which may be accessed via a client electronic device, such as notebook computer 30. For example, user 38 may compose content that is to be posted to the collaboration session via composition pane 172. For example, user 38 may type a desired text message within composition pane 172. Similarly, user 38 may copy and past an image, or other file or object (such as an audio or video file, etc.) within composition pane 172. While not shown, user interface 170 may include facilities to create various other content (e.g., audio and/or video capture, file attachments, etc.).

Resonance process 10 may receive the content from the first user for publication to the collaboration session. Continuing with the example shown in FIG. 4, once user 38 has composed the content that he wishes to post to the collaboration session, user 38 may select post button 174, e.g., using onscreen pointer 176, which may be controlled by a pointing device such as a mouse, or the like. In response to user 38 selecting post button 174, resonance process 10 may receive 102 the content 152 composed by user 38 for publication to the collaboration session.

In some embodiments, resonance process 10 may identify that the first user is creating a post for publication to the collaboration session without requiring the first user to select a "post" option. For example, resonance process 10 (alone and/or in conjunction with another process or application, such as collaboration application 54 and/or client application 10c2) may detect that user 38 is composing content to be posted to the collaboration session, e.g., in response to detecting an the occurrence of an input into composition pane 172, or the like. In such an example, in response to detecting the occurrence of an input into composition pane 172, resonance process 10 may receive 102 the content being input into composition pane 172 as content from the first user for publication to the collaboration session.

Resonance process 10 may publish 104 the content from the first user to the collaboration session. The content created by the first user may be published 104 to the collaboration session so that it may be viewed and/or accessed by at least a portion of the other participants of the collaboration session. For example, as shown in FIG. 3, a collaboration session may include page 154 (or other shared or accessible site or space). Page 154 may include, for example, a web page associated with an online forum, social networking site, or the like. Page 154 may include, at least in part, posts (e.g., content) from participants in the collaboration session. In this regard, page 154 may be updated whenever a new post from a participant of the collaboration session is received to include that new post. In one such embodiment, page 154 may include, at least in part, a time-wise listing of posts (e.g., posts 156, collectively) received from participants of the collaboration session. Posts 156 may generally be arranged according to a time that the post was received for publication to page 154. Consistent with the foregoing, resonance process 10 may publish content 152 from user 38 to page 154, for consumption by at least a portion of the participants in the collaboration session. Content 152 may generally be published to page 154 in a time-wise sequential manner relative to the other posts (e.g., posts 156) based upon, at least in part, a time at which content 152 was received 102 by resonance process 10 and/or collaboration application 54.

Resonance process 10 may prevent 106 publication of content from at least another user to the collaboration session for a resonance time period proximate publishing the content from the first user. Preventing 106 the publication of content from at least another user for the resonance time period proximate publishing the content from the first user may create a pause or break in the flow of postings to the collaboration session. For example, determining 100 an importance level associated with the first user may include determining 100 a relatively high importance associated with the first user. As such, it may be assumed that a posting by the first user may be of relatively high importance or significant, and/or otherwise noteworthy. In some embodiments, the resonance time period may allow the other participants in the collaboration session to fully read and contemplate the posting by the first user. In part, the other participants may be allowed to read and contemplate the posting (i.e., the content received 102 from the first user) by the first user without being distracted by newly added postings for the resonance time period. In some embodiments, content from certain users (e.g., moderators, participants having an equal or higher importance level than the first user, etc.) may be published during the resonance time period. Users whose content may be published during the resonance time period may be defined by system configuration, user preferences or rules, and the like.

Preventing 106 publication of content from the at least another user may include one or more of preventing display of the content by the collaboration session for the resonance time period, and preventing the creation of the content for the resonance time period. As generally discussed above, the resonance time period may, in some embodiments, provide an opportunity for other participants in the collaboration session to read and contemplate the posting by the first user. In part, the opportunity to read and contemplate the posting by the first user may arise from a pause in new content being added to the collaboration session. In an embodiment, pause in new content being added to the collaboration session during the resonance period may indicate or highlight the importance of the posting by the first user. In an embodiment, the pause in new content being added to the collaboration session during the resonance period may reduce distractions to the participants of the collaboration session during the resonance time period. The reduced distractions may allow reading and contemplating of the posting by the first user.

Consistent with the foregoing, preventing 106 publication of content from the at least another user may include preventing the display of postings via the collaboration session (e.g., on page 154) by users other than the first user during the resonance time period. For example, in the above-described example, page 154 may be updated with new postings from participants in the collaboration session as the postings are received from the participants. In an embodiment, preventing 106 publication of content from the at least another user may include preventing the display of postings received from users other than the first user during the resonance time period. For example, page 154 may not be updated during the resonance time period with postings received from other participants of the collaboration session. In an embodiment, content received during the resonance time period from participants other than the first user may be queued. In one such embodiment, the queued content from participants other than the first user may be published once the resonance period has passed. For example, once the resonance period has passed, page 154 may be updated with postings including the content from other participants that was queued during the resonance time period.

As generally described, in some embodiments preventing 106 publication of content from at least another participant of the collaboration session during the resonance time period may provide the participants of the collaboration session with the opportunity to read and contemplate the posting by the first user. In part, the opportunity to read and contemplate the posting by the first user may be provided by a reduction in distractions during the resonance time period (e.g., arising from newly posted content to the collaboration session). In an embodiment, preventing 106 publication of content from at least another participant of the collaboration session may include preventing the creation of the content for the resonance time period by the at least another participant of the collaboration session. For example, resonance process 10 may prevent participants of the collaboration session from creating content during the resonance time period. In some situations, preventing participants of the collaboration session from creating content during the resonance time period may reduce and/or prevent participants from distracting themselves during the resonance time period by trying to create content to be posted to the collaboration session. In an embodiment, resonance process 10 may disable content creation interfaces associated with the collaboration session during the resonance time period.

The resonance time period may include one or more of a time period before publishing the content from the first user and a time period after publishing the content from the first user. For example, the resonance time period, during which resonance process 10 may prevent 106 the publication of content from at least another participant of the collaboration session may include a time period (e.g., time period 158 in FIG. 3) after the publication of the content by the first user (e.g., content 152 posted to page 154). In such an example, once the content from the first user has been posted to the collaboration session (e.g., content 152 posted to page 154), resonance process 10 may prevent the publication of content from at least another participant of the collaboration session during resonance time period 158. Once resonance time period 158 has passed, resonance process 10 may again allow the publication of content from other participants to the collaboration session.

In some embodiments, in addition/as an alternative to a resonance time period following the publication of content by the first user, resonance process 10 may prevent 106 publication of content by at least another participant for a resonance time period before the publication 104 of the content from the first user. In the illustrated example of FIG. 3, resonance time period 160 may be provided before the publication of content 152 to page 154. Resonance time period 160 may provide a calm, or quiet, before the publication of the content from the first user. Resonance time period 160 may, for example, alert participants of the collaboration session that a posting from a relatively important individual is imminent. As such, resonance time period 160 may allow participants of the collaboration session to focus their attention in anticipation of the post from the first user. In an embodiment, resonance time period 160 preceding the posting of the content from the first user may be achieved by delaying publication 104 of content 152 from the first user for resonance time period 106 after content 152 is received 102 from the first user. In another embodiment, resonance process 10 may prevent publication of content from at least another user to the collaboration session upon detecting that the first user has begun composing content to be posted to the collaboration session.

The resonance time period may include a predetermined time period. For example, predetermined resonance time period (e.g., one or more of resonance time periods 158, 160) may be defined based upon, at least in part, system default, user defined rules, or the like. For example, a predetermined resonance time period of two minutes may be defined. In such an embodiment the resonance time period (e.g., one or more of resonance time periods 158, 160) proximate publishing 104 content 152 may include a two minute time period. As generally discussed above, the resonance time period proximate publishing 104 the content from the first user, during which content from at least another participant is prevented 106 from being published, may include a time period before publishing the content from the first user, a time period after publish the content from the first user, and/or both a time period before and after publishing the content from the first user. Accordingly, the time period before, the time period after, or both the time period before and after publishing the content from the first user may include a predetermined time period. Further, in an embodiment in which the resonance time period may include a time period before publishing 104 the content from the first user (e.g., time period 160) and a time period after publishing 104 the content from the first user (e.g., time period 158), the time period before and after publishing 104 the content from the first user may include the same predefined duration as one another, and/or may include different predefined durations from one another.

In addition/as an alternative to including a predefined time period, the resonance time period may be a dynamic time period based upon, at least in part, one or more of a length of the content from the first user, and a semantic complexity of the content from the first user. As generally described above, in an embodiment the resonance time period may be provided, at least in part, to provide an opportunity for participants in the collaboration session to read and contemplate the post by the first user. Resonance process 10 may, for example, analyze the content received 102 from the first user to determine the length (e.g., word count, character count, or other length determination) and/or the semantic complexity of the content. In an embodiment a relatively longer resonance time period may be provided for a relatively longer and/or more complex post by the first user. Similarly, a relatively shorter resonance time period may be provided for a relatively shorter and/or less complex post by the first user. As such, in an embodiment, the resonance time period may be provided that may be generally based upon, at least in part, an expected time for reading and contemplating the content posted by the first user. In an embodiment in which the resonance time period includes a time period before and a time period after the publication of the content by the first user, both the time period before and the time period after publication of the content may be dynamic (e.g., may be based upon, at least in part, the length and/or semantic complexity of the post). In some embodiments in which the resonance time period includes a time period before and a time period after the publication of the content by the first user, only the time period after the publication of the content may be dynamic (e.g., may be based upon, at least in part, the length and/or semantic complexity of the post). In one such embodiment, the resonance time period before publication of the post may be include a predetermined time period, and the resonance time period after publication of the post may be a dynamic time period based upon, at least in part, the length and/or semantic complexity of the post.

The resonance time period may be a dynamic time period based upon, at least in part, an importance level associated with the first user. For example, in some embodiments resonance process 10 may determine 100 an importance level associated with the first user, in which the importance level may be a relative importance level (e.g., relative to an absolute scale, and/or relative to one or more other participants in the collaboration session, etc.). In such an embodiment, the resonance time period (including one or more of a time period before publication and a time period after publication of the content by the first user) may be dynamic based upon, at least in part, the relative importance level of the first user. For example, a longer resonance time period may be implemented for a user having a relatively higher importance level, and a shorter resonance time period may be implemented for a user having a relatively lower importance level.

Resonance process 10 may receive 108 a resonance request from the first user. In one such embodiment, preventing 106 publication of content from the at least another user may be in response to the resonance request. For example, in some embodiments, resonance process 10 may prevent 106 publication of content from at least another user for a resonance time period proximate publication 104 of all content from the first user (e.g., based upon system defaults, user preferences, and/or other settings or rules implemented in connection with resonance process 10). In some embodiments, implementing a resonance time period (e.g., during which resonance process 10 may prevent 106 publication of content from other participants in the collaboration session) may be an optional feature that the first user can invoke or abstain from. For example, and referring to FIG. 4, in an embodiment user interface 170 may provide an option to publish the created content and to implement a resonance time period in connection with the post. For example, if user 38 wishes to post content 152 and to implement a resonance time period, after creating the post user 38 may select "post with resonance" button 176 using onscreen pointer 176. In response to selecting post with resonance button 176, resonance process 10 may receive 108 a resonance request from user 38. In response to receiving 108 the resonance request from user 38, resonance process may prevent 106 publication of content from at least another participant in the collaboration session for a resonance time period (e.g., one or more of time period 158, 160) proximate publication 104 of the content from user 38. Consistent with such an embodiment, user 38 may have the ability to decide whether the post he is making warrants resonance.

Figure 5:
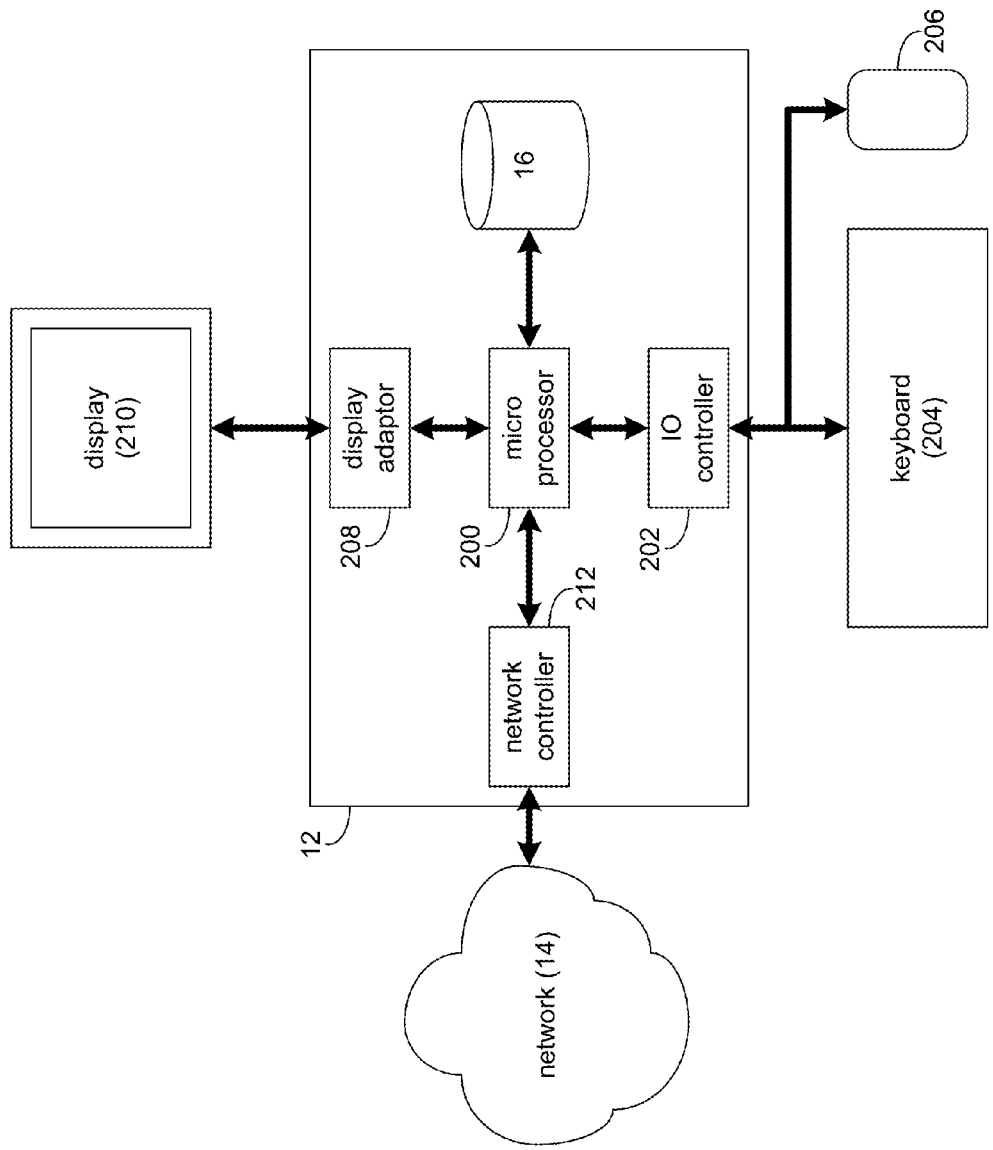
FIG. 5 is a diagrammatic view of the computing device of FIG. 1, according to an implementation of the present disclosure.

Referring also to FIG. 5, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, resonance process 10 may be substituted for computing device 12 within FIG. 5, examples of which may include but are not limited to client electronic devices 28, 30, 32, 34.

Computing system 12 may include microprocessor 200 configured to e.g., process data and execute instructions/code for resonance process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer program product comprising a computer readable storage medium having a plurality of instructions stored thereon, which, when executed by a processor, cause the processor to perform operations including:
   determining an importance level associated with a first user;
   detecting composing of content to be posted to a collaboration session from the first user;
   receiving content from the first user for publication to the collaboration session;
   publishing the content from the first user to the collaboration session;
   receiving a resonance request from the first user; and
   in response to the resonance request, preventing publication of content from at least another user to the collaboration session for a resonance time period, wherein the resonance time period is a time period after and proximate the publishing the content from the first user.

2. The computer program product of claim 1, wherein the instructions for preventing publication of content from the at least another user include instructions for one or more of preventing display of the content from the at least another user by the collaboration session, and preventing creation of the content from the at least another user by the collaboration session.

3. The computer program product of claim 1, wherein the resonance time period includes a time period before publishing the content from the first user in which there has been no publication of content.

4. The computer program product of claim 1, wherein the resonance time period includes a predetermined time period.

5. The computer program product of claim 1, wherein the resonance time period is a dynamic time period based upon, at least in part, one or more of a length of the content from the first user, and a semantic complexity of the content from the first user.

6. The computer program product of claim 1, wherein the resonance time period is a dynamic time period based upon, at least in part, the importance level associated with the first user.

7. A computing system comprising:
- a processor and a memory module coupled with the processor, the processor being configured for:
- determining an importance level associated with a first user;
- detecting composing of content to be posted to a collaboration session from the first user;
- receiving content from the first user for publication to the collaboration session;
- publishing the content from the first user to the collaboration session;
- receiving a resonance request from the first user; and
- in response to the resonance request, preventing publication of content from at least another user to the collaboration session for a resonance time period, wherein the resonance time period is a time period after and proximate the publishing the content from the first user.

8. The computing system of claim 7, wherein the processor configured for preventing publication of content from the at least another user is further configured for one or more of preventing display of the content from the at least another user by the collaboration session, and preventing creation of content from the at least another user by the collaboration session.

9. The computing system of claim 7, wherein the resonance time period includes a time period before publishing the content from the first user in which there has been no publication of content.

10. The computing system of claim 7, wherein the resonance time period includes a predetermined time period.

11. The computing system of claim 7, wherein the resonance time period is a dynamic time period based upon, at least in part, one or more of a length of the content from the first user, and a semantic complexity of the content from the first user.

\* \* \* \* \*